United States Patent [19]
Kawasaki

[11] Patent Number: 4,963,516
[45] Date of Patent: Oct. 16, 1990

[54] SIC COMPLEX SINTERED BODIES AND PRODUCTION THEREOF

[75] Inventor: Shinji Kawasaki, Nagoya, Japan

[73] Assignee: NGK Insulators, Ltd., Japan

[21] Appl. No.: 222,554

[22] Filed: Jul. 21, 1988

[30] Foreign Application Priority Data

Jul. 28, 1987 [JP] Japan .................. 62-186753
Sep. 30, 1987 [JP] Japan .................. 62-244161

[51] Int. Cl.$^5$ ............................ C04B 35/56
[52] U.S. Cl. ...................... 501/90; 501/91; 501/92; 501/96; 264/65
[58] Field of Search ........... 501/92, 90, 96, 91; 264/65

[56] References Cited

U.S. PATENT DOCUMENTS

| | | | |
|---|---|---|---|
| 4,209,474 | 6/1980 | Prochazka | 501/92 X |
| 4,541,975 | 9/1985 | Honma et al. | 501/92 X |
| 4,555,358 | 11/1985 | Matsushita et al. | 501/92 X |
| 4,705,761 | 11/1987 | Kosugi | 501/92 X |

FOREIGN PATENT DOCUMENTS 60-186468 9/1985 Japan .

Primary Examiner—Karl Group
Attorney, Agent, or Firm—Arnold, White & Durkee

[57] ABSTRACT

A silicon carbide complex sintered body including 20 to 99 wt % of SiC, 80 to 0.5 wt % of at least one compound selected from the group consisting of $W_2B_5$ and/or $MoB_2$, and 0.5 to 5 wt % of at least one material selected from the group consisting of boron, carbon, and boron carbide. A process for producing the sintered body by preparing a mixed powder is also disclosed, wherein the mixed powder includes 20 to 99 wt % of SiC powder having an average particle diameter of not greater than 5 microns, 80 to 0.5 wt % of at least one compound selected from the group consisting of $W_2B_5$ and $MoB_2$, and 0.1 to 5 wt %, when calculated as boron, of boron or a compound containing boron, and 0.1 to 5 wt %, when calculated as carbon, molding the mixture, and firing the molding in a temperature range from 1,900° to 2,500° C. in vacuum or in an inert atmosphere.

12 Claims, 3 Drawing Sheets

SIC COMPLEX SINTERED BODIES AND PRODUCTION THEREOF

BACKGROUND OF THE INVENTION

1. Field of the Invention:

The present invention relates to SiC complex sintered bodies having excellent high temperature-characteristics unique to SiC itself and high toughness. The sintered bodies can be produced by pressureless sintering. The present invention also relates to a process for producing such SiC complex sintered bodies.

2. Related Art Statement

As SiC sintered bodies having a single phase, there are silicon carbide sintered bodies containing a B-C based sintering assistant (hereinafter referred to as "B-C based SiC") and silicon carbide sintered bodies containing an Al based sintering assistant (hereinafter referred to as "Al based SiC"). Although the B-C based SiC has excellent characteristics at high temperatures, its toughness is poor ($K_{IC}=2$–3 MN/m$^{3/2}$). On the other hand, although the Al based SiC has excellent toughness, its characteristics at high temperatures are poor.

With respect to Al based SiC, Japanese patent application Laid-open No. 60-186,468 discloses ceramic structural bodies and a process for producing the same, aiming at higher toughness. The ceramic structural bodies contain at least one kind of boride of elements in Group Va or VIa of the periodic in silicon carbide. The sintered bodies are obtained by mixing elements in a specified composition, molding the mixture, and firing the molding in a temperature range from 1,900° C. to 2,500° C.

However, according to specific examples of ceramic structural bodies disclosed in the above Japanese patent application Laid-open No. 60-186,468, fracture toughness is improved by using $W_2B$ or $MoB_2$ and Al as an additive and a sintering assistant, respectively, and promoting densification by hot pressing. The reason why the firing is effected by hot pressing is that since $W_2B$ is difficult to sinter, densification cannot be attained by pressureless sintering. When $MoB_2$ is added to Al based SiC, densification cannot be effected by pressureless sintering either. However, sintered bodies having complicated shapes cannot be obtained by hot pressing, which has low industrial applicability from standpoint of the mass productivity and manufacturing cost.

When an Al based assistant is used, an intergranular phase having a low melting point generally remains in an SiC intergranular phase, so that strength and oxidation resistance at high temperatures are. Consequently, the thus obtained sintered bodies have fatal defects as materials for use at high temperatures.

SUMMARY OF THE INVENTION

It is an object of the present invention to solve the above-mentioned problems, and to provide high strength, high toughness SiC complex sintered bodies and a process for producing such highly tough SiC complex sintered bodies by pressureless sintering, while maintaining the characteristics at high temperatures which are unique to SiC.

According to a first aspect of the present invention, there is a provision of an SiC complex sintered body characterized by consisting essentially of 20 to 99 wt% of SiC, 80 to 0.5 wt% of $W_2B_5$ and/or $MoB_2$, and 0.5 to 5% of at least one kind of boron, carbon, and boron carbide.

According to a second aspect of the present invention, there is a provision of a process for producing an SiC complex sintered body, comprising the steps of mixing powders of a mixture consisting essentially of 20 to 99 wt% of SiC powder having an average particle diameter of not more than 5 μm, 80 to 0.5 wt%, when calculated as $W_2B_5$ and/or $MoB_2$, of $W_2B_5$ or a compound producing $W_2B_5$ and/or $MoB_2$ or a compound producing $MoB_2$, 0.1 to 5 wt%, when calculated as boron, of boron or a compound containing boron, and 0.1 to 5 wt%, when calculated as carbon; of carbon or an organic compound producing carbon, molding the mixture; and firing the molding in a temperature range from 1,900° C. to 2,500° C. in vacuum or an inert atmosphere.

In the above construction, by incorporating a specified amount of $W_2B_5$ and/or $MoB_2$ into B-C based SiC, toughness which is poor for the B-C based SiC can be improved and the SiC complex sintered bodies having high strength at high temperatures and high toughness can be obtained by pressureless firing. That is, since $W_2B_5$ and $MoB_2$ have high thermal stability, they exhibit excellent characteristics at high temperatures. Further, since $W_2B_5$ has a higher Young's modulus as compared with SiC, crack deflection phenomenon that cracks proceeding in an SiC matrix are recoiled by $W_2B_5$ grains is effectively exhibited to improve toughness. On the other hand, since hardness greatly differs between $MoB_2$ and SiC, the crack deflection phenomenon that cracks proceeding in a sintered body are recoiled at interfaces between $MoB_2$ grains and SiC grains is effectively exhibited to also improve toughness. Further, $W_2B_5$ itself also has an effect to promote densification during the sintering, and thus high density which has not been attained in conventional SiC sintered bodies can be obtained by pressureless sintering.

In addition, in the B-C based SiC, it is known that SiC grains abnormally grow up to several hundreds μm during a final stage of the sintering, i.e., at sintering temperatures not less than 2,100° C. to hinder densification and greatly deteriorate characteristics of sintered bodies. Thus, it was necessary to set the sintering temperature at substantially not more than 2,100° C. Since $MoB_2$ can effectively restrain the above abnormal grain growth, sintering can be effected at sintering temperatures more than 2,100° C. Consequently, high density which has not been attained in conventional SiC sintered bodies can be attained by pressureless sintering and sintered bodies having desired shapes can be produced.

These and other objects, features and advantages of the invention will be appreciated when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
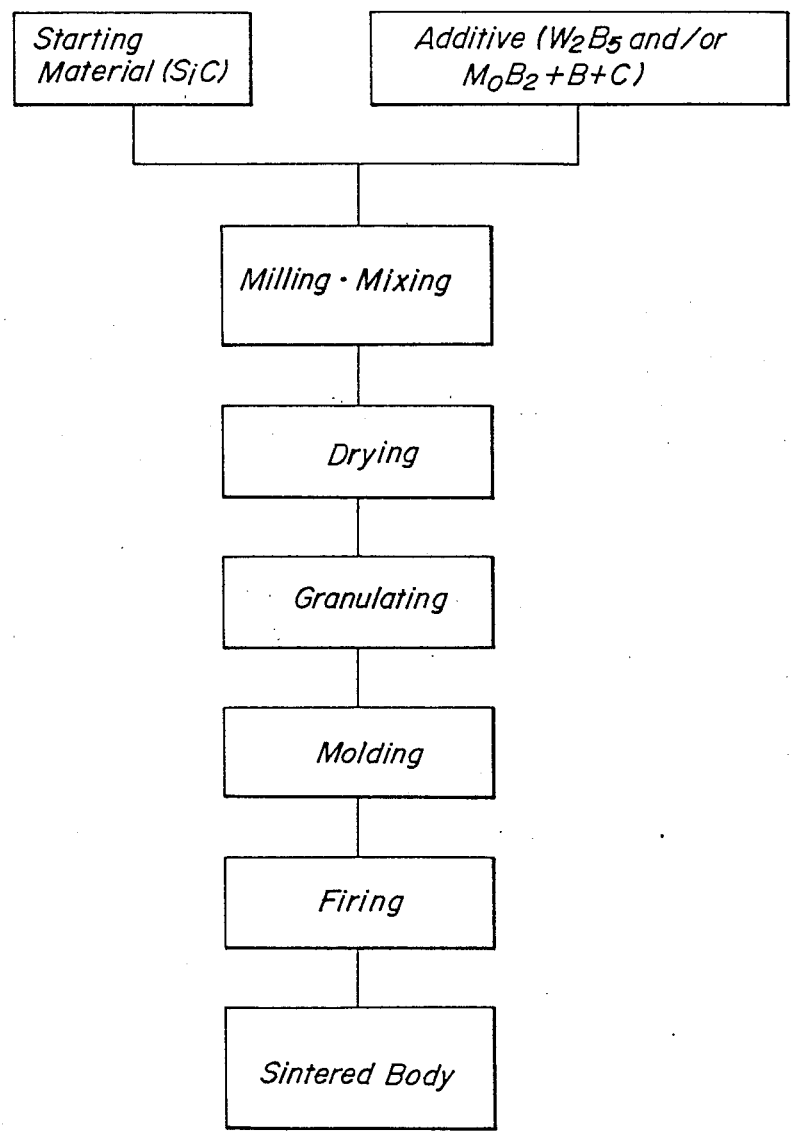
FIG. 1 is a flow chart illustrating an example of producing steps of the producing process according to the present invention.

First, Young's modulus, hardnesses, and melting points of various bodies and SiC are shown together in the following Table 1. These data were extracted from Samsonoff: High Melting Point Compounds Manual and El Be Caterinicoff: Super High Melting Point Materials Manual.

TABLE 1

|  | Young's modulus (kg/mm$^2$) | Hardness (kg/mm$^2$) | Melting point (°C.) |
|---|---|---|---|
| W$_2$B$_5$ | 79,000 | — | 2,370 |
| TiB$_2$ | 54,000 | 3,370 ± 60 | 2,790 |
| ZrB$_2$ | 35,000 | 2,252 ± 22 | 3,200 |
| NbB$_2$ | 65,000 | 2,600 | 3,000 |
| Mo$_2$B$_5$ | — | 1,200 | 2,350 |
| HfB$_2$ | — | 2,900 ± 500 | 3,250 |
| TaB$_2$ | 26,200 | 2,500 ± 42 | 3,037 |
| SiC | 39,400 | 3,600 | 2,540 |

The above-mentioned effects are first obtained in B-C based complex sintered bodies of SiC-W$_2$B$_5$ and/or MoB$_2$, but have not formerly been known at all.

Now, limitations made in the present invention will specifically be explained.

The reason why the average particle diameter of SiC powder as a starting material is limited to not more than 5 μm is that if it exceeds 5 μm, densification cannot be effected by pressureless sintering.

The reason why the mixing ratio of SiC is limited to a range from 20 to 99 wt% is that if the total amount of the other ingredients exceeds 80 wt%, characteristics of SiC as a base cannot fully be exhibited, while if it is less than 1 wt%, effects of improving characteristics due to addition of the additives cannot be obtained. The mixing ratio of SiC ranges preferably from 30 to 95 wt%, more preferably from 40 to 90 wt%.

The reason why the total mixing ratio of W$_2$B$_5$ and/or MoB$_2$ is limited to a range from 80 to 0.5 wt% is that if it exceeds 80 wt%, characteristics at high temperatures are deteriorated, while if it is less than 0.5 wt%, toughness is not improved and the effect of restraining abnormal grain growth cannot be obtained. As to W$_2$B$_5$ alone, the mixing ratio is preferably from 70 to 5 wt%, more preferably from 60 to 10 wt%. As to MoB$_2$ alone, the mixing ratio is preferably from 70 to 0.5 wt%, and more preferably from 60 to 0.5 wt%.

The reason why the total amount of at least one kind of boron, carbon and boron carbide in the sintered body is limited to a range from 0.5 to 5 wt% is that if it falls outside the range, densification is not fully effected so that high strength SiC complex sintered bodies cannot be obtained.

The reason why an amount of B or the B-forming compound is limited to 0.1 to 5 wt% is that if it is less than 0.1 wt%, an effect due to addition thereof cannot be recognized and densification is not caused, while if it exceeds 5 wt%, densification is hindered and a great amount of B remains in the intergranular phase to deteriorate high temperature characteristics.

Further, the reason why an amount of C or the C-forming compound is limited to 0.1 to 5 wt% is that if it is less than 0.1 wt%, an SiO$_2$ film on the surface of SiC cannot fully be removed, while if it exceeds 5 wt%, a great amount of free carbon remains in the sintered body to deteriorate the characteristics.

Next, the process for producing SiC complex sintered bodies according to the present invention will be explained by way of example with reference to FIG. 1.

First, a starting powder of SiC is adjusted to the average particle diameter of not less than 5 μm, and W$_2$B$_5$ or a W$_2$B$_5$-forming compound and/or MoB$_2$ or a MoB$_2$-forming compound, B or a B-forming compound, and C or a C-forming compound are prepared as additives. The SiC starting powder and the additives are mixed and milled at specified proportions together with an appropriate binder such as isopropyl alcohol by using a wet type ball mill. After being dried, the milled mixture is granulated, and preliminarily molded. The preliminary molding is molded in a desired shape by hydrostatic press. The molding is finally fired in a temperature range from 1,900° C. to 2,500° C. in vacuum or in an inert gas atmosphere to obtain a sintered product. The temperature range is preferably from 1,900° to 2,300° C. when W$_2$B$_5$ is employed alone.

The reason why the firing temperature is limited to the range from 1,900° to 2,500° C. is that if it is less than 1,900° C., densification cannot fully be effected, while if it is more than 2,500° C. silicon carbide is greatly decomposed to roughen the surface of the sintered body, so that sufficiently smooth surface cannot be obtained.

For example, the SiC starting powder to be used in the producing process according to the present invention consists of 93 wt% of β-SiC and the remainder being α-SiC, and has the average particle diameter of 0.42 μm and a specific surface area of 20.0 m$^2$/g with the following composition.

TABLE 2

|  | (wt %) |
|---|---|
| Total Si | 69.13 |
| Free SiO$_2$ | 0.47 |
| Free Si | 0.010 |
| Free C | 0.51 |
| O | 0.90 |
| Al | 0.056 |
| Fe | 0.060 |
| Ca | 0.016 |
| Mg | 0.001 |
| K | <0.001 |
| Na | 0.001 |
| Cu | — |
| Ti | 0.007 |
| N | 0.27 |

In the above producing process of the present invention, it may be that instead of addition of W$_2$B$_5$ and/or MoB$_2$, W and/or Mo, or another boride or an oxide thereof is added separately from a boron-containing additive, and that W$_2$B$_5$ and/or MoB$_2$ is formed in a molding or a mixed powder during an initial stage of firing or by another heat treatment before the firing. In this case, it is necessary to add an excess amount of B enough to fully synthesize W$_2$B$_5$ and/or MoB$_2$. In addition, it is also possible to improve characteristics of sintered bodies by further densifying them in capsulized HIP or capsule-free HIP after the firing.

As the $W_2B_5$-forming material, W may be used. As the $MoB_2$-forming material, Mo may be used. As the B-containing compound, $B_4C$ may be used. As the C-forming organic compound, phenolic resin may be used.

Next, the present invention will be explained in more detail with reference to specific experiments.

EXPERIMENT 1

First, a starting powder of SiC was prepared to have the average particle diameter of not more than 5 μm, which was mixed with $W_2B_5$ as an additive and B (metallic boron) and C (carbon black) as sintering assistant in a wet type ball mill at a compounding recipe shown in Table 3 by using isopropyl alcohol. The mixture was dried and granulated, and then preliminarily molded and hydrostatically pressed at 3 tons/cm² to obtain a square plate of 60×60×6 mm. The thus obtained plate was heated up to 1,500° C. in vacuum, and then fired at 2,100° C. in argon atmosphere for one hour. In such a way, sintered bodies in the Examples according to the present invention and Comparative Examples were obtained. Example 5-2 is an example obtained by HIP treatment of a sintered body in Example 5 at 2,000° C. under 2,000 atm.

The thus obtained sintered bodies were mirror polished, and their denseness was evaluated by measuring relative densities based on a pore distribution. Further, strengths at room temperature and at high temperatures were measured at room temperature and 1,400° C. by a four point bending test according to JIS R-1601 (fine ceramic bending strength testing method). Moreover, toughness was evaluated by determining $K_{IC}$ at room temperature according to Chevron Notch method, and W compounds were identified in the sintered bodies by the X ray diffraction test using a CuKα line. Results are shown in Table 3.

TABLE 3(a)

| | Additive (wt %) $W_2B_5$ | Sintering assistant (wt %) B | Sintering assistant (wt %) C | Relative density of sintered body (%) | Four point bending strength (MPa) room temperature | Four point bending strength (MPa) 1,400° C. | $K_{IC}$ (MN/m$^{3/2}$) | W compound in sintered body |
|---|---|---|---|---|---|---|---|---|
| Example 1 | 0.5 | 1.0 | 4.0 | 97 | 600 | 580 | 3.3 | $W_2B_5$ |
| Example 2 | 5 | 1.0 | 4.0 | 98 | 670 | 640 | 4.2 | " |
| Example 3 | 10 | 1.0 | 4.0 | 98 | 720 | 700 | 4.6 | " |
| Example 4 | 30 | 1.0 | 4.0 | 98 | 800 | 780 | 5.5 | " |
| Example 5 | 50 | 1.0 | 4.0 | 97 | 820 | 800 | 5.9 | " |
| Example 5-2 | 50 | 1.0 | 4.0 | not less than 99 | 930 | 910 | 6.2 | " |
| Example 6 | 70 | 1.0 | 4.0 | 94 | 770 | 690 | 5.5 | " |
| Example 7 | 50 | 0.3 | 4.0 | 97 | 830 | 790 | 5.8 | " |
| Example 8 | 50 | 2 | 4.0 | 96 | 780 | 750 | 5.8 | " |
| Example 9 | 50 | 5 | 4.0 | 94 | 750 | 710 | 5.6 | " |
| Example 10 | 50 | 1.0 | 2 | 97 | 810 | 800 | 5.9 | " |

TABLE 3(b)

| | Additive (wt %) $W_2B_5$ | Sintering assistant (wt %) B | Sintering assistant (wt %) C | Relative density of sintered body (%) | Four point bending strength (MPa) room temperature | Four point bending strength (MPa) 1,400° C. | $K_{IC}$ (MN/m$^{3/2}$) | W compound in sintered body |
|---|---|---|---|---|---|---|---|---|
| Comparative Example 1 | 0 | 1.0 | 4.0 | 96 | 550 | 530 | 2.6 | not contained |
| Comparative Example 2 | 90 | 1.0 | 4.0 | 87 | 650 | 330 | 4.8 | $W_2B_5$ |
| Comparative Example 3 | 50 | 0 | 4.0 | 82 | 420 | 330 | — | " |
| Comparative Example 4 | 50 | 10 | 4.0 | 87 | 600 | 520 | 4.9 | " |
| Comparative Example 5 | 50 | 1.0 | 0 | 64 | 280 | 220 | — | " |
| Comparative Example 6 | 50 | 1.0 | 10 | 86 | 490 | 480 | 5.2 | " |

As is evident from Table 3, Examples 1–10 meeting the composition range according to the present invention had higher density and more excellent strength at high temperatures as compared with Comparative Examples 1–6. Further, as compared with $K_{IC}$ (2–3) in conventional SiC containing no $W_2B_5$, Examples 1–10 exhibited higher $K_{IC}$ values and their toughness increase. Example 5-2 having undergone HIP treatment after firing had excellent properties in all respects.

It was confirmed that the compound of W in the sintered body was $W_2B_5$ shown in JCPDS card No. 30-1358.

Figure 2:
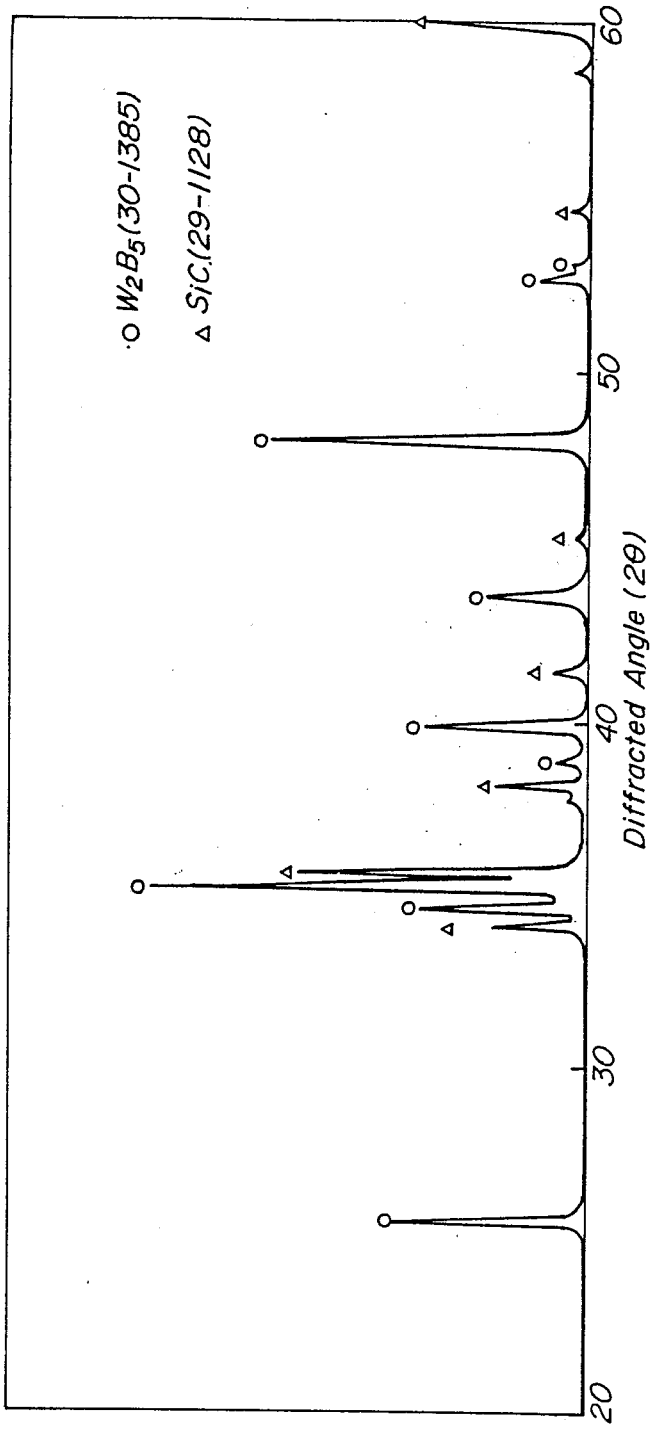
FIG. 2 is a diffraction pattern in an X-ray diffraction test using a CuKα line with respect to a sintered body in Example 4 obtained according to the present invention.

A diffraction pattern of Example 4 in an X-ray diffraction test by using a CuKα line is shown in FIG. 2.

By the chemical analysis of the sintered bodies, 0.01 to 0.06 wt% of inevitable metallic impurities (Al, Fe, Ca, Mg, Ti, Mn, etc.) contained in the SiC starting material and the additives was detected.

EXPERIMENT 2

A boride other than $W_2B_5$, a carbide or an oxide of W, or W alone was added, instead of $W_2B_5$ as the indispensable ingredient in the present invention, to a SiC starting powder, which was milled and kneaded, and sintered bodies were obtained in the same process as in Experiment 1.

Then, the relative density of the sintered bodies and a compound of W were determined by the same methods as in Experiment 1. Results are shown in Table 4.

TABLE 4

|  | Additive (wt %) | Sintering assistant (wt %) B | Sintering assistant (wt %) C | Relative density of sintered body (%) | W compound in sintered body |
|---|---|---|---|---|---|
| Example 11 | W:50 | 10 | 4.0 | 97 | $W_2B_5$ |
| Example 12 | WC:50 | 10 | 4.0 | 95 | $W_2B_5$ |
| Comparative Example 7 | W:50 | 1.0 | 4.0 | 60 | WC, WB |
| Comparative Example 8 | $W_2C$:50 | 1.0 | 4.0 | 60 | WC, WB |
| Comparative Example 9 | WC:50 | 1.0 | 4.0 | 59 | WC, WB |
| Comparative Example 10 | $W_2B$:50 | 1.0 | 4.0 | 61 | WB |
| Comparative Example 11 | WB:50 | 1.0 | 4.0 | 67 | $W_2B_5$, WB |
| Comparative Example 12 | $WO_3$:50 | 1.0 | 4.0 | 57 | WC, WB |
| Comparative Example 13 | W:50 | 5 | 4.0 | 64 | WC, WB |
| Comparative Example 14 | WC:50 | 5 | 4.0 | 62 | WC, WB |

As is evident from results in Table 4, in Comparative Examples 7-12 having an additive other than $W_2B_5$, high relative density, i.e., densification of sintered bodies having a conventionally known amount of B (1 wt% added) could not be achieved. Further, as is evident from Comparative Examples 13 and 14, even if an amount of B was increased but it was not converted to $W_2B_5$ in a sintered body, high relative density could not be achieved, either.

As is evident form Examples 11 and 12, when the amount of B was further increased and B was added more than 2.5 times in mole W (W: 50 wt%, B: 7.3 wt%), $W_2B_5$ was formed in the sintered body during the firing initial stage, so that densification was effected as in the case that $W_2B_5$ was added as shown in Example 1 of the captioned application.

As is clear in the aforegoing, according to the SiC complex sintered bodies and the producing process thereof in the present invention, toughness which is poor for the B-C based SiC can be improved by incorporating a specified amount of $W_2B_5$ into the B-C based SiC while maintaining high temperature characteristics. Further, SiC complex sintered bodies having high strength at high temperatures and high toughness can be obtained.

In Table 5 is shown by comparison characteristics of SiC complex sintered bodies according to the present invention and a prior art technique.

TABLE 5

|  | SiC—$W_2B_5$ according to the invention | Al based sintering assistant + SiC—$W_2B_5$ | B—C base sintering assistant + SiC | Al base sintering assistant + SiC |
|---|---|---|---|---|
| High temperature characteristic | good | bad | good | bad |
| Toughness | good | good | bad | good |
| Mass productivity and producing cost | good (pressureless sintering) | bad (hot press) | good (pressureless sintering) | bad (hot press) |

EXPERIMENT 3

SiC powder having the average particle diameter of not more than 5 μm, $MoB_2$ as an additive, and B (metallic boron) and C (carbon black) as a sintering assistant were mixed together with isopropyl alcohol at a mixing recipe shown in Table 6 by a wet type ball mill. The mixture was dried and granulated, which was preliminarily molded and then hydrostatically pressed at 3 tons/cm² to produce a square plate of 60×60×6 mm. The plate was heated up to 1,500° C. in vacuum, and then fired at 2,200° C. under 1 atm in argon atmosphere for 1 hour. In such a way, sintered bodies according to Examples of the present invention and Comparative Examples were obtained. Example 104-2 is a product obtained by HIP treatment of a sintered body in Example 104 at 2,000° C. under 2,000 atms.

With respect to the thus obtained sintered bodies, denseness, strengths at room temperature and at high temperatures (1,500° C.), and toughness were evaluated by the same methods as in Experiment 1. Further, a Mo compound in the sintered bodies was identified by an X ray diffraction method using CuKα. Results are shown in Table 6.

TABLE 6(a)

|  | Additve (wt %) $MoB_2$ | Sintering assistant (wt %) B | Sintering assistant (wt %) C | Relative density of sintered body (%) | Four point bending strength (MPa) room temperature | Four point bending strength (MPa) 1,500° C. | $K_{IC}$ (MN/m$^{3/2}$) | Mo compound in sintered body | Presence or absence of abnormal grain growth in sintered body |
|---|---|---|---|---|---|---|---|---|---|
| Comparative Example 101 | 0 | 1.0 | 4.0 | 92 | 450 | 360 | 2.3 | not contained | present |
| Example 101 | 0.5 | 1.0 | 4.0 | 98 | 670 | 670 | 4.0 | $MoB_2$ | no |
| Example 102 | 5 | 1.0 | 4.0 | 98 | 690 | 670 | 4.4 | " | " |
| Example 103 | 10 | 1.0 | 4.0 | 98 | 720 | 700 | 4.8 | " | " |
| Example 104 | 30 | 1.0 | 4.0 | 98 | 740 | 730 | 5.2 | " | " |
| Example 104-2 | 30 | 1.0 | 4.0 | not less than 99 | 870 | 850 | 5.5 | " | " |
| Example 105 | 50 | 1.0 | 4.0 | 97 | 710 | 690 | 4.7 | " | " |
| Example 106 | 70 | 1.0 | 4.0 | 92 | 640 | 560 | 4.1 | " | " |
| Comparative | 90 | 1.0 | 4.0 | 82 | 490 | 230 | 2.9 | " | " |

TABLE 6(a)-continued

|  | Additive (wt %) MoB$_2$ | Sintering assistant (wt %) B | Sintering assistant (wt %) C | Relative density of sintered body (%) | Four point bending strength (MPa) room temperature | Four point bending strength (MPa) 1,500° C. | K$_{IC}$ (MN/m$^{3/2}$) | Mo compound in sintered body | Presence or absence of abnormal grain growth in sintered body |
|---|---|---|---|---|---|---|---|---|---|
| Example 102 |  |  |  |  |  |  |  |  |  |

TABLE 6(b)

|  | Additive (wt %) MoB$_2$ | Sintering assistant (wt %) B | Sintering assistant (wt %) C | Relative density of Sintered body (%) | Four point bending strength (MPa) room temperature | Four point bending strength (MPa) 1,500° C. | K$_{IC}$ (MN/m$^{3/2}$) | Mo compound in sintered body | Presence or absence of abnormal grain growth in sintered body |
|---|---|---|---|---|---|---|---|---|---|
| Comparative Example 103 | 30 | 0 | 4.0 | 74 | 310 | 260 | — | " | no |
| Example 107 | 30 | 0.3 | 4.0 | 97 | 680 | 670 | 4.8 | " | " |
| Example 108 | 30 | 2 | 4.0 | 98 | 720 | 700 | 5.0 | " | " |
| Example 109 | 30 | 5 | 4.0 | 95 | 680 | 650 | 4.9 | " | " |
| Comparative Example 104 | 30 | 10 | 4.0 | 89 | 490 | 400 | 3.9 | " | " |
| Comparative Example 105 | 30 | 1.0 | 0 | 62 | 250 | 230 | — | " | " |
| Example 110 | 30 | 1.0 | 2 | 97 | 740 | 720 | 5.1 | " | " |
| Comparative Example 106 | 30 | 1.0 | 10 | 85 | 500 | 490 | 3.4 | " | " |

As is evident from Table 6, Examples 101 to 110 satisfying the composition range according to the present invention had higher denseness and more excellent strength at high temperatures as compared with Comparative Examples 101 to 106, and had higher K$_{IC}$ values as compared with K$_{IC}$(2-3) in the conventional case of SiC containing no MoB$_2$ as well as higher toughness. In Comparative Example 101 added with no MoB$_2$, abnormal grain growth of SiC was recognized, but no such abnormal grain growth was recognized in the other Examples. In addition, Example 104 having undergone the HIP treatment after the firing had more excellent characteristics in all respects.

Furthermore, it was confirmed that the Mo compound in the sintered bodies was MoB$_2$, as indicated in JCPDS card No. 6-682.

Figure 3:
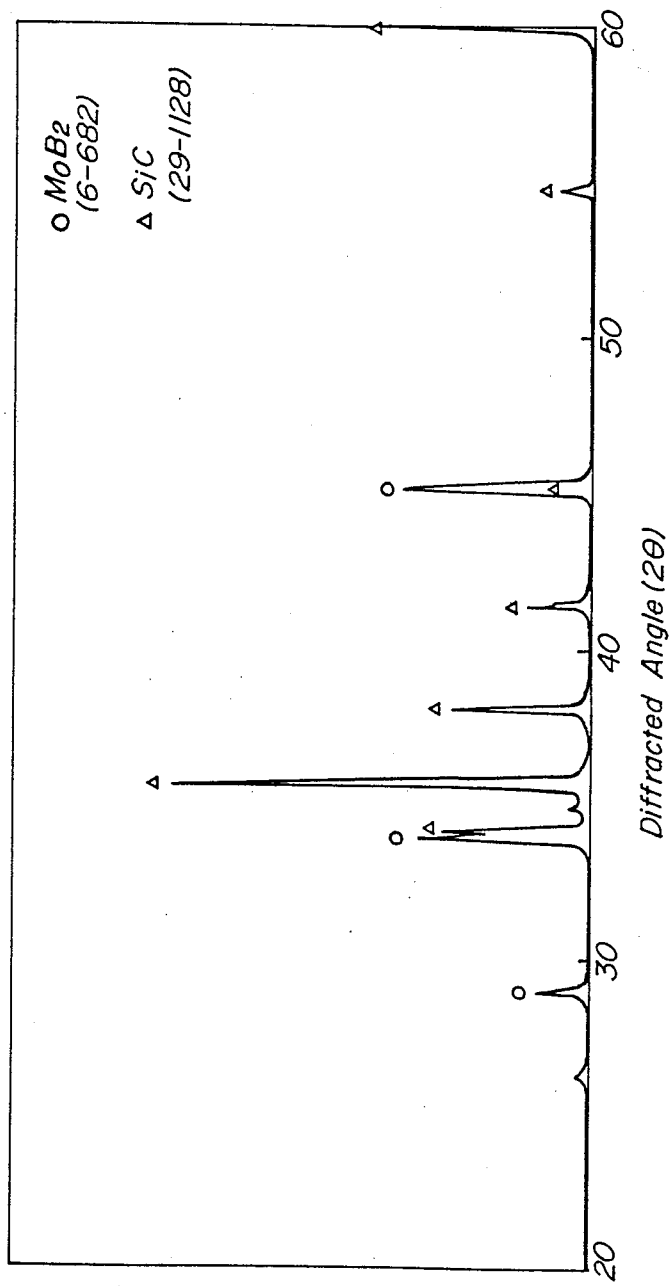
FIG. 3 is a diffraction pattern in an X-ray diffraction test using a CuKα line with respect to a sintered body in Example 103 obtained according to the present invention.

FIG. 3 shows an X ray diffraction pattern of Example 3 in Table 3 by using CuKα.

As a result of the chemical analysis of the to 0.08 wt% of inevitable metallic impurities (Al, Fe, Ca, Mg, Ti, Mn, etc.) contained in the SiC starting material and the additives were detected.

EXPERIMENT 4

Instead of MoB$_2$ as the indispensable ingredient of the present invention, a boride other than MoB$_2$, a carbide or an oxide of Mo, or Mo was added, followed by milling and mixing, and sintered bodies were obtained by the same method as in Experiment 3.

Then, with respect to the thus obtained sintered bodies, the relative density and a Mo compound were determined by the same methods as in Experiment 3. Results are shown in Table 7.

TABLE 7

|  | Additive (wt %) | Sintering assistant (wt %) B | Sintering assistant (wt %) C | Relative density of Sintered body (%) | Mo compound in sintered body |
|---|---|---|---|---|---|
| Comparative Example 107 | Mo:30 | 1.0 | 4.0 | 58 | MoC, Mo$_2$BC |
| Comparative Example 108 | Mo$_2$C:30 | 1.0 | 4.0 | 57 | MoC, Mo$_2$BC |
| Comparative Example 109 | MoC:30 | 1.0 | 4.0 | 57 | MoC, Mo$_2$BC |
| Comparative Example 110 | Mo$_2$B:30 | 1.0 | 4.0 | 62 | MoB |
| Comparative Example 111 | MoB:30 | 1.0 | 4.0 | 63 | MoB$_2$, MoB |
| Comparative Example 112 | MoO$_3$:30 | 1.0 | 4.0 | 55 | MoC, Mo$_2$BC |
| Comparative Example 113 | Mo:30 | 5 | 4.0 | 61 | MoB, MoB$_2$ |
| Example 111 | Mo:30 | 10 | 4.0 | 98 | MoB$_2$ |
| Comparative Example 114 | MoC:30 | 5 | 4.0 | 62 | MoB, MoB$_2$ |
| Example 112 | MoC:30 | 10 | 4.0 | 97 | MoB$_2$ |

As is evident from the results in Table 7, in the case of Comparative Examples 107 to 112 using an additive other than MoB$_2$, high relative density, i.e., densification of the sintered bodies could not be achieved if B was contained in a conventionally known amount. Further, in Comparative Examples 13 and 14 having an increased amount of B, when B was not converted to MoB$_2$ in the sintered body, high relative density could not be achieved.

In the case of Examples 111 and 112 in which the amount of B was further increased up to an addition amount being more than two times in mole % than that of Mo (Mo: 30 wt%, B: 6.8 wt%), MoB$_2$ was formed in the molding during the firing initial stage, so that densification could be attained as in the case with Example 101 in which Mo was added in the form of MoB$_2$.

As is evident from the foregoing detailed explanation, according to the SrC complex sintered bodies and the producing process thereof in the present invention, by incorporating a specified amount of $MoB_2$ into the B-C based SiC, sintering can be effected at high temperatures and toughness which is poor in the B-C based SiC can be improved while strength at high temperatures is maintained. Further, SiC complex sintered bodies having high strength at high temperature and high toughness can be obtained by pressureless sintering.

In Table 8, characteristics of the SiC complex sintered bodies according to the present invention are shown in comparison with those of a prior art technique.

TABLE 8

|  | SiC—$MoB_2$ according to the invention | Al based sintering assistant + SiC—$MoB_2$ | B—C based sintering assistant + SiC | Al based sintering assistant + SiC |
| --- | --- | --- | --- | --- |
| High temperature characteristic | good | bad | good | bad |
| Toughness | good | good | bad | good |
| Mass productivity and producing cost | good (pressureless sintering) | bad (hot press) | good (pressureless sintering) | bad (hot press) |

What is claimed is:

1. A pressureless sintered silicon carbide complex sintered body consisting essentially of 20 to 99 wt% of SiC, 70 to 5 wt% of $W_2B_5$, and 0.5 to 5 wt% of at least one material selected from the group consisting of boron, carbon, and boron carbide.

2. A pressureless sintered silicon carbide complex sintered body according to claim 1, wherein $W_2B_5$ is present in an amount from 60 to 10 wt%.

3. A pressureless sintered silicon carbide complex sintered body according to claim 1, wherein SiC is present in amount from 30 to 95 wt %.

4. A pressureless sintered silicon carbide complex sintered body according to claim 1, wherein SiC is present in amount from 40 to 90 wt %.

5. A pressureless sintered silicon carbide complex sintered body consisting essentially of 20 to 99 wt % of SiC, 70 to 0.5 wt % of $MoB_2$, and 0.5 to 5 wt % of at least one material selected from the group consisting of boron, carbon, and boron carbide, wherein said sintered body consists crystalline phases of $MoB_2$ and SiC.

6. A pressureless sintered silicon carbide complex sintered body according to claim 5, wherein $MoB_2$ is present in an amount from 60 to 0.5 wt%.

7. A pressureless sintered silicon carbide complex sintered body according to claim 5, wherein SiC is present in amount from 30 to 95 wt %.

8. A pressureless sintered silicon carbide complex sintered body according to claim 5, wherein SiC is present in an amount from 40 to 90 wt %.

9. A process for producing pressureless sintered silicon carbide complex sintered bodies having a relative density of at least 92%, comprising the steps of:

mixing powders to form a mixture consisting essentially of 20 to 99 wt% of SiC powder having an average particle diameter of not greater than 5 microns, 80 to 0.5 wt%, when calculated as $W_2B_5$, of $W_2B_5$, or a $W_2B_5$-forming compound, 0.1 to 5 wt%, when calculated as boron, of boron or a compound containing boron, and 0.1 to 5 wt%, when calculated as carbon, of carbon or an organic compound producing carbon;

molding the mixture; and firing the molding in a temperature range from 1,900° to 2,500° C. in vacuum or in an inert atmosphere to form said silicon carbide complex sintered bodies.

10. A process according to claim 9, further comprising subjecting the SiC complex sintered bodies to a capsule HIP or a capsule-free HIP treatment.

11. A process for producing pressureless sintered silicon carbide complex sintered bodies, comprising the steps of:

mixing powders to form a mixture consisting essentially of 20 to 99 wt. % of SiC powder having an average particle diameter of not greater than 5 microns, 80 to 0.5 wt %, when calculated as $MoB_2$, of $MoB_2$, or a $MoB_2$-forming compound, 0.1–5 wt %, when calculated as boron, of boron or a compound containing boron, and 0.1 to 5 wt %, when calculated as carbon, of carbon or an organic compound producing carbon;

molding the mixture; and firing the molding in a temperature range from 1,900° to 2,500° C. in vacuum or in an inert atmosphere to form said silicon carbide complex sintered bodies;

wherein said sintered bodies consist of crystalline phases of $MoB_2$ and Sic.

12. A process according to claim 11, further comprising subjecting the SiC complex sintered bodies to a capsule HIP or a capsule free HIP treatment.

* * * * *